(12) United States Patent
Katano et al.

(10) Patent No.: US 10,511,042 B2
(45) Date of Patent: Dec. 17, 2019

(54) FUEL CELL UNIT AND VEHICLE HAVING FUEL CELL UNIT

(71) Applicant: TOYOTA JIDOSHA KABUSHIKI KAISHA, Toyota-shi, Aichi-ken (JP)

(72) Inventors: Koji Katano, Toyota (JP); Hiroyuki Sekine, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 168 days.

(21) Appl. No.: 15/408,762

(22) Filed: Jan. 18, 2017

(65) Prior Publication Data

US 2017/0214071 A1 Jul. 27, 2017

(30) Foreign Application Priority Data

Jan. 25, 2016 (JP) .................. 2016-011201
Jun. 22, 2016 (JP) .................. 2016-123160

(51) Int. Cl.
*H01M 8/04* (2016.01)
*H01M 8/04858* (2016.01)
*H01M 8/04537* (2016.01)

(52) U.S. Cl.
CPC ... *H01M 8/04873* (2013.01); *H01M 8/04582* (2013.01); *H01M 2250/20* (2013.01)

(58) Field of Classification Search
CPC .......... H01M 8/04873; H01M 2220/20; B60L 11/1898; B60L 50/72
USPC .......................................................... 429/428
See application file for complete search history.

(56) References Cited

U.S. PATENT DOCUMENTS

| | | | |
|---|---|---|---|
| 2003/0091882 A1 | 5/2003 | Schmidt et al. | |
| 2007/0007060 A1 | 1/2007 | Ono et al. | |
| 2007/0178345 A1 | 8/2007 | Takeda et al. | |
| 2012/0028135 A1 | 2/2012 | Ohashi | |
| 2013/0045398 A1 | 2/2013 | Katano et al. | |
| 2013/0306387 A1 | 11/2013 | Katano et al. | |

FOREIGN PATENT DOCUMENTS

| | | |
|---|---|---|
| CN | 103347724 A | 10/2013 |
| JP | 2013-244759 A | 12/2013 |
| JP | 2013-255395 | 12/2013 |
| JP | 2014-086171 A | 5/2014 |
| JP | 2014-187831 | 10/2014 |
| WO | WO2010/137151 A1 | 12/2010 |

*Primary Examiner* — Basia A Ridley
*Assistant Examiner* — James M Erwin
(74) *Attorney, Agent, or Firm* — Finnegan, Henderson, Farabow, Garrett & Dunner, LLP (57) ABSTRACT

A fuel cell unit includes a fuel cell and a converter. A fuel cell has single cells laminated in a given direction. A converter has a plurality of combinations of a reactor electrically connected with the fuel cell and a power module electrically connected with the reactor. At least either a direction in which first reactors among the reactors are arrayed or a direction in which first power modules among the power modules are arrayed is parallel with a laminating direction of the single cells.

13 Claims, 10 Drawing Sheets

FUEL CELL UNIT AND VEHICLE HAVING FUEL CELL UNIT

INCORPORATION BY REFERENCE

The disclosures of Japanese Patent Application No. 2016-011201 and 2016-123160 filed on Jan. 25, 2016 and Jun. 22, 2016 including the specifications, drawings and abstracts are incorporated herein by reference in their entirety.

BACKGROUND

1. Technical Field

The disclosure relates to a fuel cell unit and a vehicle in which the fuel cell unit is mounted.

2. Description of Related Art

There is a fuel cell unit that is provided with a fuel cell and a converter. The fuel cell has a plurality of single cells that are laminated, and the converter has a plurality of combinations of reactors that are electrically connected with the fuel cell, and power modules that are electrically connected with the reactors (Japanese Patent Application Publication No. 2014-187831 (JP 2014-187831 A)). The fuel cell unit is mounted, for example, as one of motor drive power sources in an electrically driven vehicle that is caused to travel by motor drive.

SUMMARY

In the fuel cell unit described in JP 2014-187831 A, a direction in which the reactors and the power modules are arrayed in the converter intersects generally orthogonally in the horizontal direction with a laminating direction in which the plurality of single cells are laminated in the fuel cell. In such a fuel cell unit, there are instances where the number of single cells is changed in order to achieve output performance in accordance with a type of an electrically driven vehicle on which the fuel cell unit is mounted. In general, when output performance is increased, the numbers of the reactors and the power modules are increased, and when output performance is decreased, the numbers of the reactors and the power modules are decreased. Therefore, as output performance is changed, the numbers of the reactors and the power modes are changed as well. However, in such a case, it is necessary to make a significant design change of the fuel cell unit because a dimension change direction of the fuel cell having the plurality of single cells and dimension change directions of the reactors and the power modules intersect with each other generally orthogonally and thus have different dimension change directions from each other. The present disclosure provides a fuel cell unit and a vehicle having the fuel cell unit, which can restrain a significant design change of a fuel cell unit when a fuel cell unit having output performance according to a type of an electrically driven vehicle is designed.

It is possible to carry out the disclosure as the following aspects.

The first aspect of the disclosure provides a libel cell unit. The fuel cell unit according to the first aspect includes a fuel cell and a converter. The fuel cell includes single cells laminated in a given direction. The converter includes a plurality of combinations of a reactor electrically connected with the fuel cell and a power module electrically connected with the reactor. At least either a direction in which first reactors among the reactors are arrayed or a direction in which first power modules among the power modules are arrayed is parallel with a laminating direction of the single cells.

According to this aspect of the disclosure, in the fuel cell unit, an array direction of any of reactors and power modules having a size that greatly affects a design of the fuel cell unit may be parallel with a laminating direction in which single cells are laminated, Therefore, in comparison with a mode where an array direction of any of a reactor and a power module having a size that greatly affects a design of a fuel cell unit intersects generally orthogonally to a laminating direction in which single cells are laminated, a dimension change direction of the fuel cell having the plurality of single cells is parallel with a dimension change direction of at least one of the reactor and the power module, meaning that the dimension change directions are the same. Therefore, it is possible to restrain a significant design change of a fuel cell unit when designing the fuel cell unit having output performance according to a type of an electrically driven vehicle. This means that a design change of a fuel cell unit, which is caused by adjustments of the numbers of the reactors and power modules and the number of the single cells, is restrained from being complex. Further, since an increase and a decrease of output performance correspond to an increase and a decrease of dimensions of the fuel cell unit, it is possible to produce a fuel cell unit in various sizes meticulously in accordance with an increase and a decrease of output performance.

In the first aspect of the disclosure, the fuel cell may be on an upper side of the converter in a gravitational direction or on a lower side of the converter in the gravitational direction.

In the first aspect of the disclosure, both the direction in which the first reactors are arrayed and the direction in which the first power modules are arrayed may be parallel with the laminating direction.

A second aspect of the disclosure may provide a vehicle having the fuel cell unit. In the second aspect of the disclosure, the fuel cell may be adjacent to the converter.

In the second aspect of the disclosure, the fuel cell may be located on an upper side of the converter in an up-down direction of the vehicle or a lower side of the converter in the up-down direction of the vehicle.

In the second aspect of the disclosure, the laminating direction may be parallel with a vehicle width direction of the vehicle.

According to this aspect of the disclosure, even when a length in the vehicle width direction changes, the design of the fuel cell unit is changed easily, making it easier to handle variation development of the vehicle. In other words, since it is possible to design the fuel cell unit in a variety of sizes in accordance with an increase and a decrease of output performance, it becomes easier to handle variation development of the vehicle.

In the second aspect of the disclosure, the laminating direction may be parallel with a front-rear direction of the vehicle.

According to this aspect, even in a case where a length in the front-rear direction changes, the design of the fuel cell unit is changed easily, making it easier to handle variation development of the vehicle. In other words, since it is possible to design the fuel cell unit in a variety of sizes in accordance with an increase and a decrease of output performance, it becomes easier to handle variation development of the vehicle.

In the second aspect of the disclosure, one of the single cells at outermost positions in the laminating direction and the one of the first reactors at outermost positions in the laminating direction may be located on a same plane perpendicular to the laminating direction. The direction in which the first reactors are arrayed may be parallel with the laminating direction. The first reactors may be arrayed in a direction toward the other one of the single cells at the outermost positions in the laminating direction from the one of the first reactors at the one of the outermost positions in the laminating direction. One of the single cells at the outermost positions in the laminating direction and the one of the first power modules being at outermost positions in the laminating direction may be located on a same plane perpendicular to the laminating direction. The direction in which the first power modules are arrayed may be parallel with the laminating direction. The first power modules may be arrayed in a direction toward the other one of the single cells at the outermost positions in the laminating direction from the one of the first power modules at the one of the outermost positions in the laminating direction.

In the second aspect of the disclosure, the fuel cell may be adjacent to the converter in a front-rear direction of the vehicle.

In the second aspect of the disclosure, the fuel cell may be adjacent to the converter in a vehicle width direction of the vehicle.

The third aspect of the disclosure may provide a fuel cell unit. In the third aspect of the disclosure, the converter may include at least either a second reactor or a second power module. The second reactor may be in a direction inclined to the laminating direction as seen from one of the first reactors. The second power module may be in a direction inclined to the laminating direction as seen from one of the first power modules.

The third aspect of the disclosure may provide a fuel cell unit. In the fuel cell unit according to the third aspect, one of the single cells at outermost positions in the laminating direction and the one of the first reactors at outermost positions in the laminating direction may be located on a same plane perpendicular to the laminating direction. The direction in which the first reactors are arrayed may be parallel with the laminating direction. The first reactors may be arrayed in a direction toward the other one of the single cells at the outermost positions in the laminating direction from the one of the first reactors at the one of the outermost positions in the laminating direction. One of the single cells at the outermost positions in the laminating direction and the one of the first power modules being at outermost positions in the laminating direction may be located on a same plane perpendicular to the laminating direction. The direction in which the first power modules are arrayed may be parallel with the laminating direction. The first power modules may be arrayed in a direction toward the other one of the single cells at the outermost positions in the laminating direction from the one of the first power modules at the one of the outermost positions in the laminating direction.

The aspects of the disclosure are not limited to the fuel cell unit, and the disclosure may also be applied to various aspects such as a fuel cell unit mounted on a ship that uses electric power as its power source, a fuel cell unit for household use, and so on. Further, the disclosure is not limited to the above-mentioned aspects, and, it is obvious that the disclosure is carried out in various aspects without departing from the gist of the disclosure.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
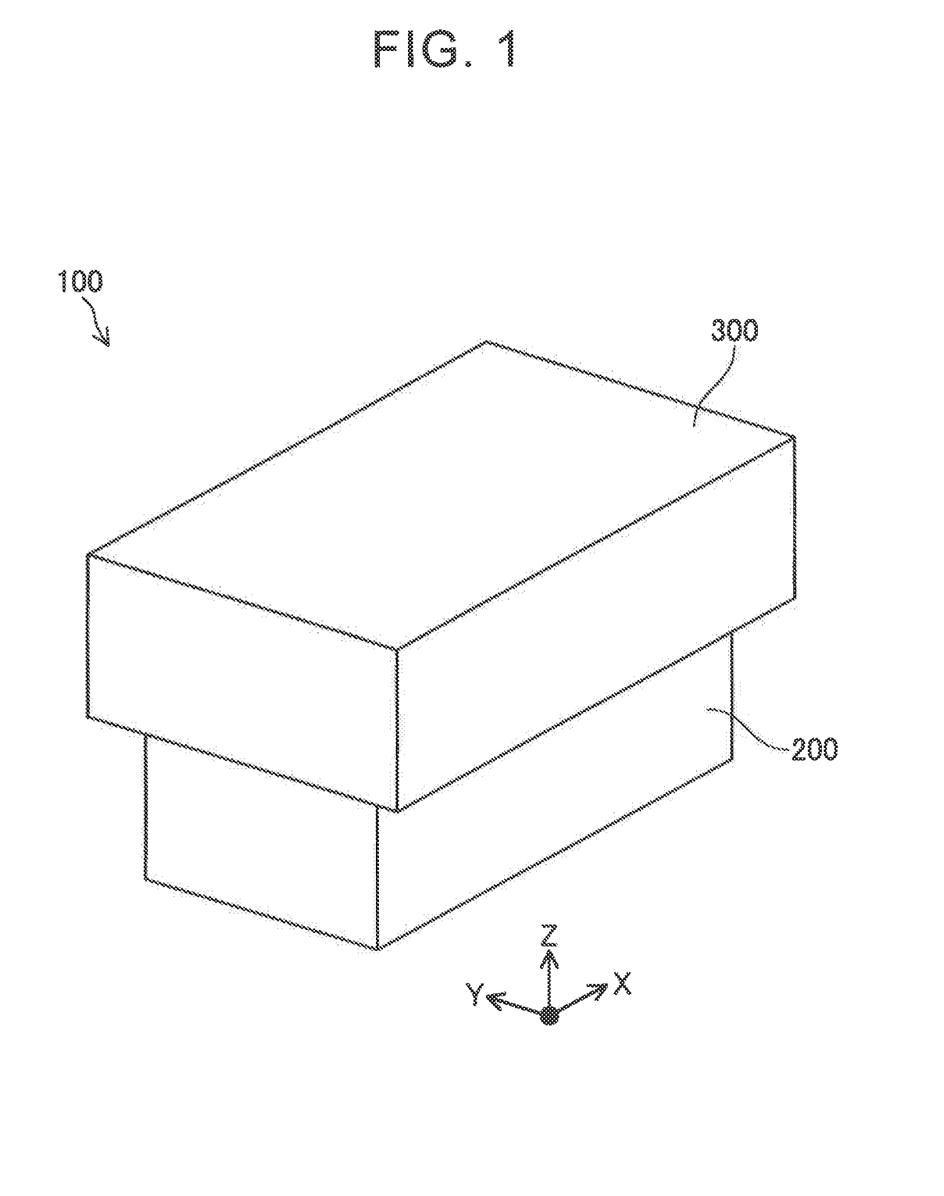
FIG. 1 is a conceptual view of a layout structure of a fuel cell unit according to an embodiment of the disclosure.

A. The first embodiment: FIG. 1 is a conceptual view showing a layout structure of a fuel cell unit 100 according to an embodiment of the disclosure. FIG. 1 shows XYZ axes that intersect orthogonally to one another. The XYZ axes in FIG. 1 correspond to the XYZ axes in the other drawings. The fuel cell unit 100 is mounted as a power source for a vehicle that is driven by a motor. The fuel cell unit 100 is provided with a fuel cell case 200 and a converter case 300.

Figure 2:
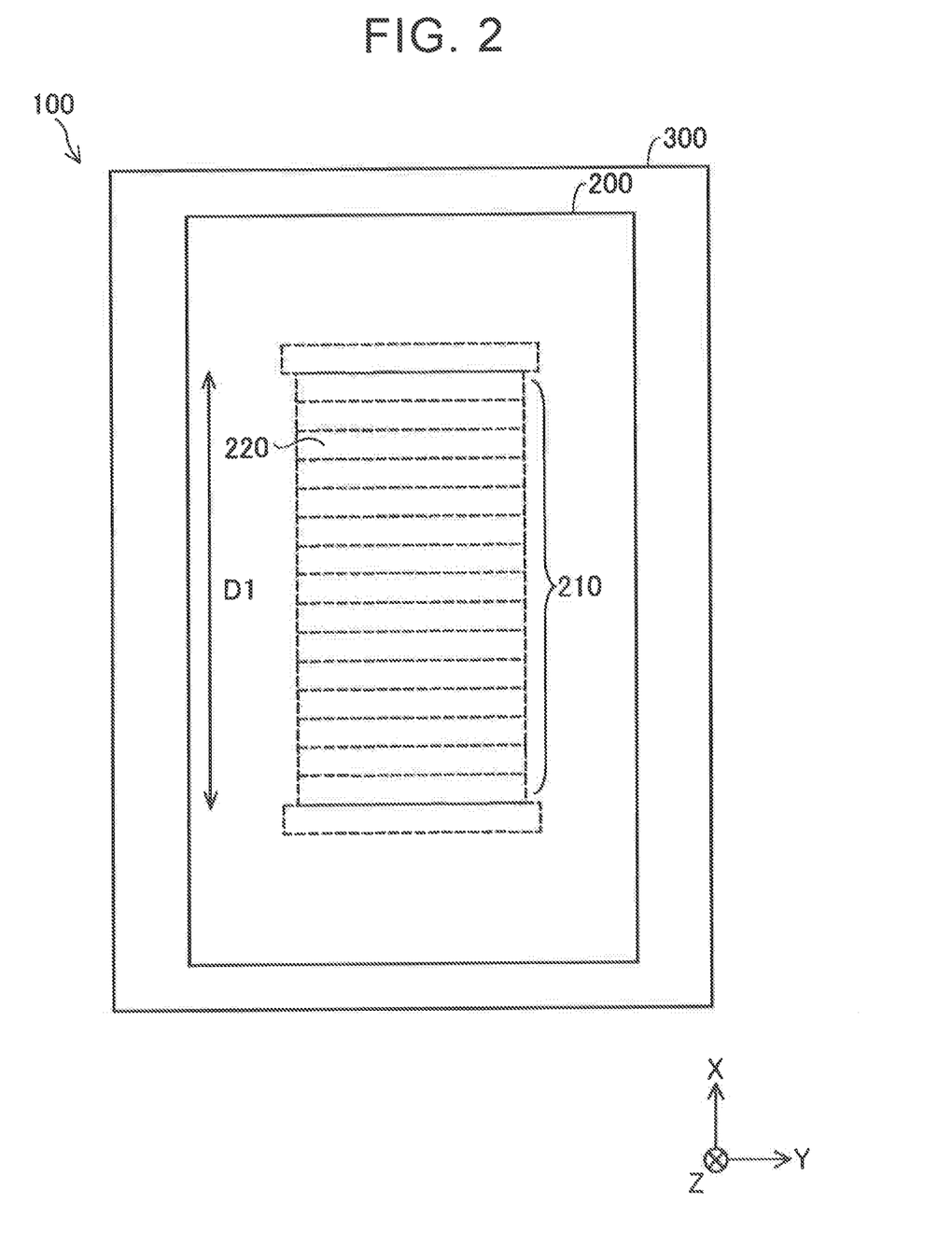
FIG. 2 is an explanatory view of the fuel cell unit seen from the negative side of the Z axis direction.

FIG. 2 is an explanatory view of the fuel cell unit 100 seen from the negative side of the Z axis direction. The fuel cell case 200 is a box-shaped member arranged on the negative side of the Z axis direction with respect to the converter case 300. In this embodiment, the size of the fuel cell case 200 is smaller than that of the converter case 300. A fuel cell 210 is housed inside the fuel cell case 200.

The fuel cell 210 has a plurality of single cells 220 that generate power using electrochemical reaction of reactant gas. The single cells 220 are fastened as a compressive load is applied to them in a state of being laminated in a laminating direction D1. In this embodiment, the laminating direction D1 of the single cells 220 is the X axis direction. In this embodiment, the fuel cell 210 receives supply of hydrogen gas and air and generates power using electrochemical reaction between hydrogen and oxygen.

Figure 3:
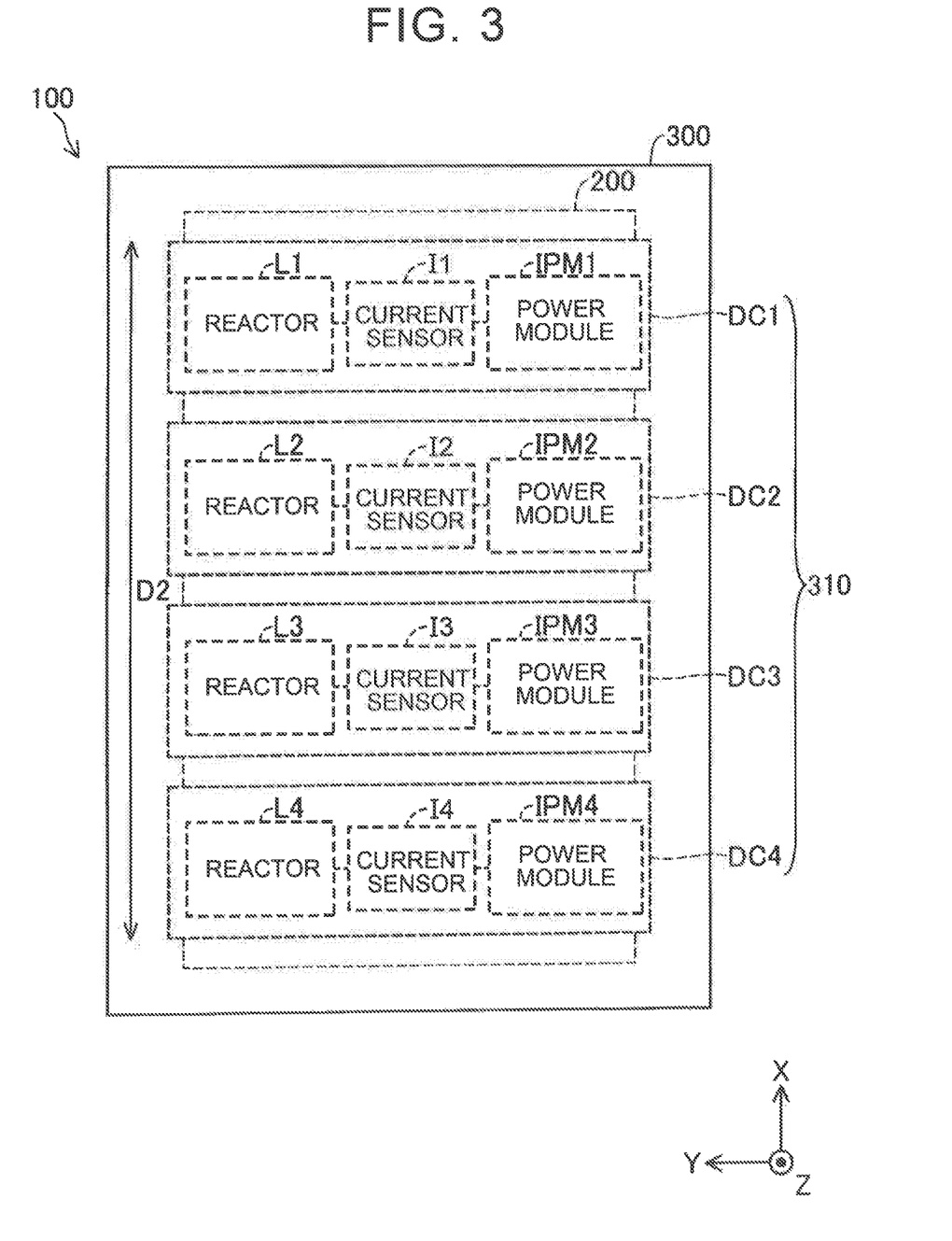
FIG. 3 is an explanatory view of the fuel cell unit seen from the positive side of the Z axis direction.

FIG. 3 is an explanatory view of the fuel cell unit 100 seen from the positive side of the Z axis direction. The converter case 300 is a box-shaped member arranged on the positive side of the Z axis direction with respect to the fuel cell case 200. A multi-phase converter 310 is housed inside the converter case 300.

The multi-phase converter 310 adjusts and outputs voltage inputted from the fuel cell 210. In this embodiment, the multi-phase converter 310 adjusts voltage inputted from the fuel cell 210 into voltage suitable for motor drive and outputs it. The multi-phase converter 310 includes converters in four phases that are a U-phase converter DC1, a V-phase converter DC2, a W-phase converter DC3, and an X-phase converter DC4. The U-phase converter DC1, the V-phase converter DC2, the W-phase converter DC3 and the X-phase converter DC4 are connected in parallel with each other.

The U-phase converter DC1 is provided with a reactor L1, a current sensor and a power module IPM1.

The reactor L1 is electrically connected with the fuel cell 210. The reactor L1 is structured from a circular core portion and a coil wound around an outer periphery of the core portion. The reactor L1 is able to store power and emit stored power. The power storing action and the power emitting action by the reactor L1 are used for a voltage boosting operation and a voltage step-down operation by the U-phase converter DC1.

The current sensor I1 is arranged between the reactor L1 and the power module IPM1. The current sensor I1 detects current flowing from the reactor L1 to the power module IPM1.

Figure 4:
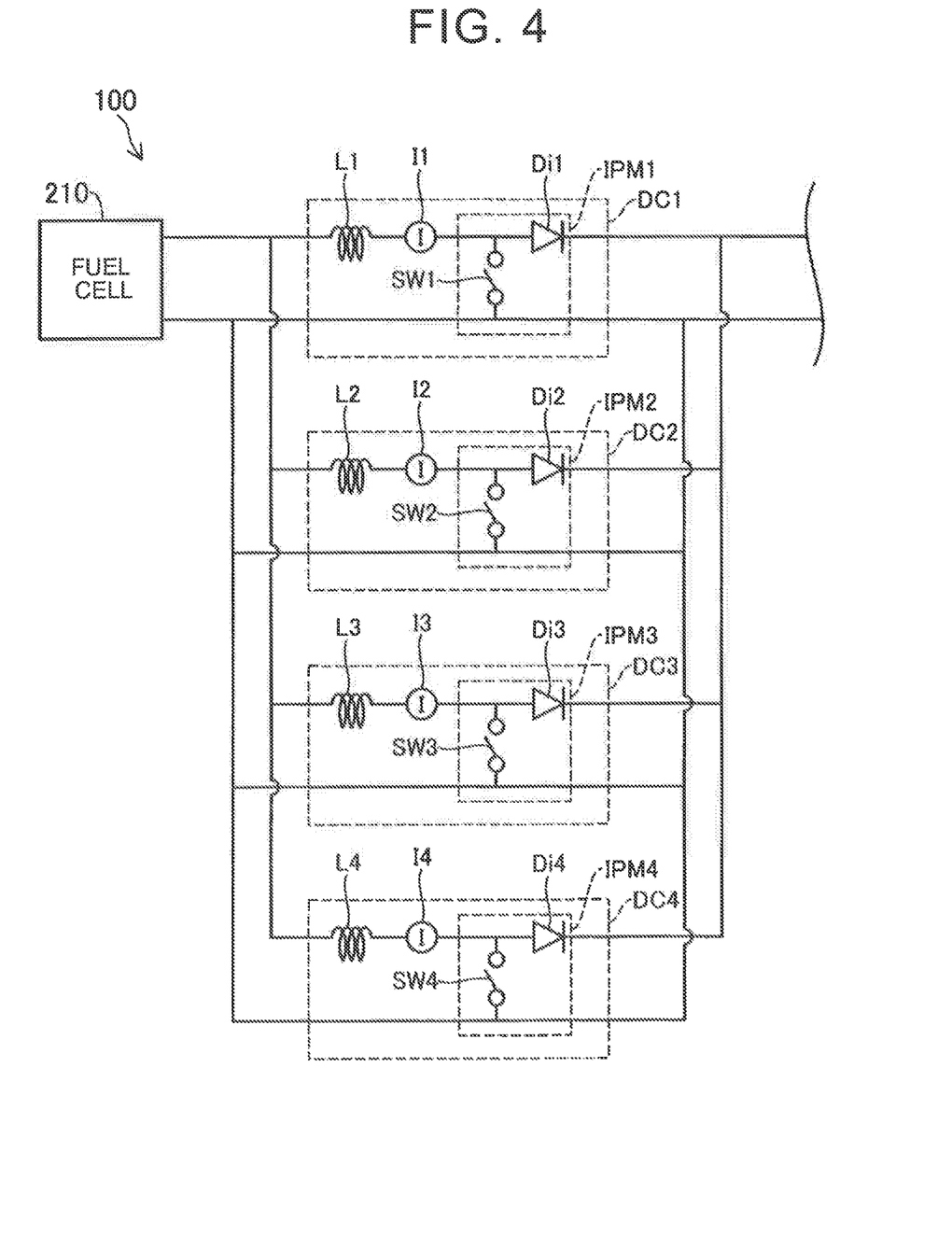
FIG. 4 is an explanatory view of a circuit structure of the fuel cell unit.

FIG. 4 is an explanatory view showing a circuit structure of the fuel cell unit 100. The power module IPM1 is a circuit module in which a plurality of semiconductor elements is incorporated. The power module IPM1 has a switching element SW1 and a diode Di1.

The switching element SW1 causes the reactor L1 to repeat power storage and emission periodically by carrying out periodic switching control when voltage is inputted from the fuel cell 210. Power emitted by the reactor L1 is outputted through the diode Di1, The diode Di1 is a so-called switching diode.

The L1-phase converter DC1 adjusts inputted voltage by adjusting a duty ratio (a ratio between the on state and the off state) in the switching element SW1, and outputs it.

Similarly to the U-phase converter DC1, the V-phase converter DC2, the W-phase converter DC3, and the X-phase converter DC4 include corresponding reactors L2, L3, L4, current sensors I2, I3, I4, and the power modules IPM2, IPM3, IPM4, respectively. Similarly to the power module IPM1, the power modules IPM2, IPM3, IPM4 include corresponding diodes Di2, Di3, Di4, and the switching elements SW2, SW3, SW4, respectively. In the explanation below, a reference symbol "L" is used for the reactors collectively, and a reference symbol "IPM" is used for the power modules collectively.

In this embodiment, the power module IPM is of a double-sided cooling type, in which a semiconductor element is cooled from both sides. In another embodiment, the power module IPM may be of a single-sided cooling type, in which a semiconductor element is cooled from a single side surface.

The V-phase converter DC2, the W-phase converter DC3 and the X-phase converter DC4 adjust and output voltage inputted from the fuel cell 210 according to the same principle as that of the U-phase converter DC1. The switching elements SW1, SW2, SW3, SW4 perform switching control by adjusting duty ratios in the switching elements SW1, SW2, SW3, SW4, respectively, so that current values measured by the current sensors I1, I2, I3, I4 become equal.

Referring back to FIG. 3, the reactors L and the power modules IPM are arrayed in a direction D2 that is generally parallel with the X axis direction. Further, the single cells 220 in the fuel cell 210 are laminated in the X axis direction as the laminating direction D1. This means that, in this embodiment, both the direction in which the reactors L are arrayed and the direction in which the power modules IPM are arrayed are the direction D2, and generally parallel with the laminating direction D1 of the single cells 220. In this embodiment, both the size of the reactors L and the size of the power modules IPM greatly affect the design of the fuel cell unit 100.

The meaning of "a direction being parallel with another direction" in this embodiment is that an angle between two directions in comparison is within a range of discrepancy of 5 degrees, and more preferably, within a range of discrepancy of 3 degrees.

According to the embodiment explained so far, in the fuel cell unit 100, the direction D2 in which the reactors L and the power modules IPM are arrayed, and the laminating direction D1 in which the single cells are laminated are generally parallel with one another. Thus, compared to the form where the direction in which the reactors and the power modules are arrayed and the laminating direction in which the single cells are laminated intersect generally orthogonally to each other, the dimension change direction of the fuel cell 210 having the plurality of single cells 220 is generally parallel with a dimension change direction of at least either the reactors L and the power modules IPM. Thus, the dimension change directions are the same. Therefore, when designing the fuel cell unit 100 having output performance in accordance with a type of electrically driven vehicle, it is possible to restrain a significant design change of the fuel cell unit 100. This means that a design change of the fuel cell unit 100 due to adjustments of the numbers of the reactors L and the power modules IPM and the number of the single cells 220 is restrained from becoming complex. Further, because an increase and a decrease in output performance correspond to an increase and a decrease in dimension of the fuel cell unit 100, it is possible to meticulously produce fuel cell unit 100 in various sizes in accordance with an increase and a decrease in output performance.

For example, when one tries to change a design of a fuel cell unit having given output performance to be fit with a compact electrically driven vehicle provided with a fuel cell unit with lower output performance, it is necessary to reduce the numbers of reactors and power modules in order to lower output performance, and it is also necessary to reduce the size of the fuel cell unit so as to be mounted on the compact electrically driven car. However, in the form where array directions of reactors and power modules and a laminating direction in which single cells are laminated intersect generally orthogonally to each other, just reducing the numbers of reactors and power modules does not realize a size reduction of a fuel cell unit. Therefore, in order to reduce a size of a fuel cell unit, it is necessary to make a significant change in the design of the fuel cell unit. Meanwhile, in the fuel cell unit 100 according to the first embodiment, the dimension change direction of the fuel cell 210 having the plurality of single cells 220 and the dimension change directions of the reactors L and the power modules IPM are in generally parallel with one another, meaning that the dimension change directions are the same. Thus, when designing the fuel cell unit 100 having output performance in accordance with a type of an electrically driven vehicle, it is possible to restrain a significant change in the design of the fuel cell unit 100.

Figure 5:
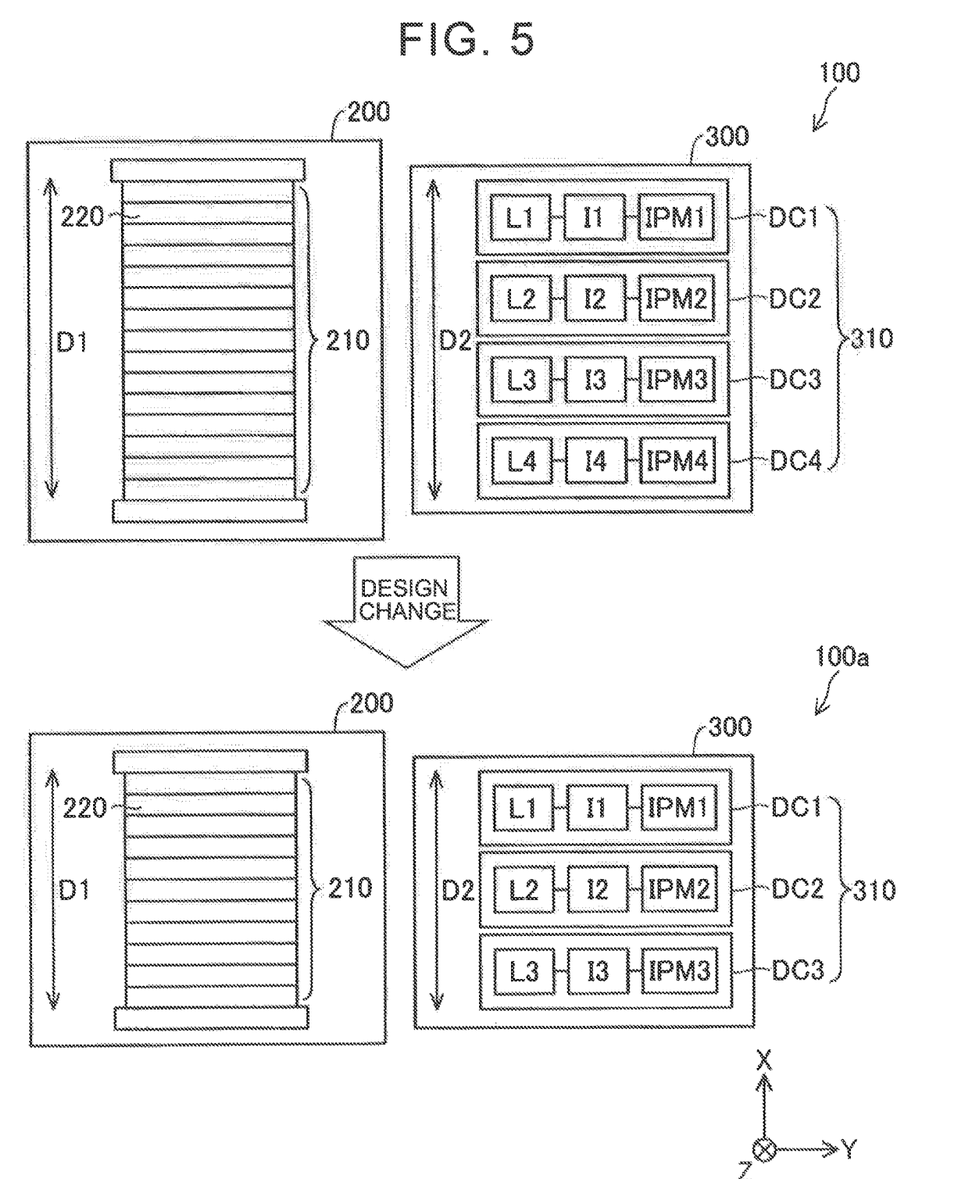
FIG. 5 is an explanatory view of changes when a design of the fuel cell unit is changed.

FIG. 5 is an explanatory view showing changes when the design of the fuel cell unit 100 is changed. In the upper section in FIG. 5, the fuel cell unit 100 is shown. In the lower section in FIG. 5, a fuel cell unit 100a is shown, which is the fuel cell unit 100 after the design change. In FIG. 5, the components of the multi-phase converter 310 are denoted by the reference numerals, respectively, in order to simplify the drawing.

The fuel cell unit 100a has output performance lower than that of the fuel cell unit 100. The design change from the fuel cell unit 100 to the fuel cell unit 100a is made by reducing the numbers of the reactors L and the power modules IPM and the number of single cells 220 from those of the fuel cell unit 100. In the fuel cell unit 100, the direction D2 in which the reactors L and the power modules IPM are arrayed, and the laminating direction D1 in which the single cells are laminated are generally parallel with each other. Therefore, compared to the form where the array directions of the reactors L and the power modules IPM and the laminating direction in which the single cells 220 are laminated intersect generally orthogonally to one another, the dimension change direction of the fuel cell 210 having the plurality of single cells 220 is generally parallel with the dimension change direction of at least either the reactors L or the power modules IPM, meaning that the dimension change directions are the same. It is thus possible to restrain the design change of the fuel cell unit 100 from becoming complex.

Figure 6:
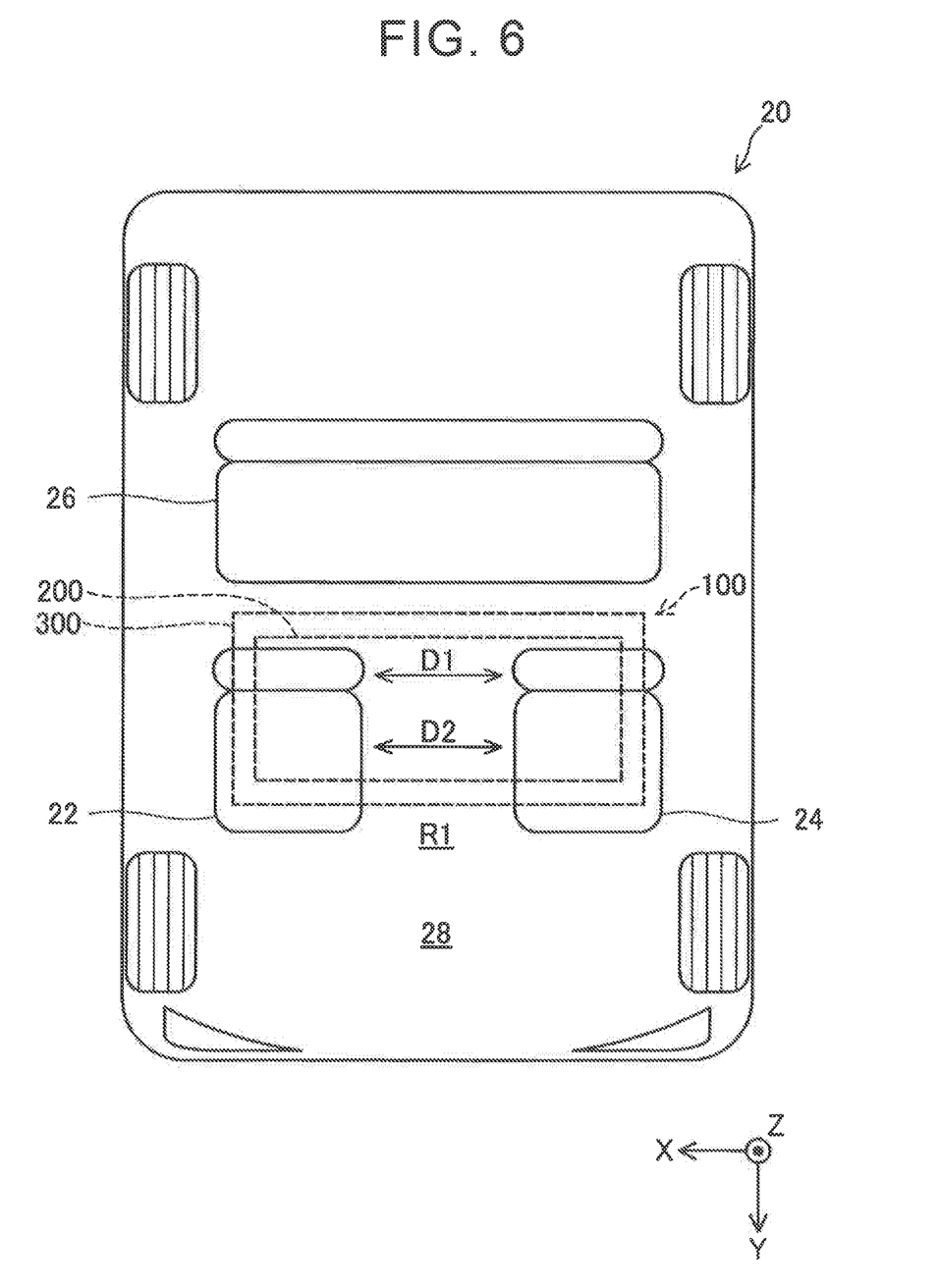
FIG. 6 is an explanatory view showing a skeleton of a vehicle having the fuel cell unit according to the first embodiment.

B. The second embodiment: FIG. 6 is an explanatory view showing a skeleton of a vehicle 20 having the fuel cell unit 100 according to the first embodiment. The vehicle 20 is an electrically driven vehicle driven by a motor. The front part of the vehicle 20 is directed to the positive side of the Y axis direction. The vehicle 20 is provided with seats 22, 24, 26 and a floor part 28.

The seats 22, 24, 26 are structured so as to allow passengers to be seated. The seat 22 is located on the positive side of the X axis direction in the vehicle 20. The seat 24 is located on the negative side of the X axis direction in the vehicle 20. The seat 26 is located on the negative side of the Y axis direction with respect to the seat 22 and the seat 24. The floor part 28 is located on the negative side of the Z axis direction with respect to the seats 22, 24, 26, and defines the negative side of the Z axis direction in the vehicle interior of the vehicle 20.

A space in the vehicle 20 for the fuel cell unit 100 to be mounted is an interior region R1 of the vehicle 20, which is on the negative side of the Z axis direction with respect to the floor part 28.

In the fuel cell unit 100, the direction D2 in which the reactors L and the power modules IPM are arrayed, and the laminating direction D1 in which the single cells 220 are laminated are generally parallel with each other along the vehicle width direction of the vehicle 20. Therefore, even with the vehicle 20 having the interior region R1 that is relatively narrow in the vehicle width direction, it is possible to mount the fuel cell unit 100 on the vehicle 20 by changing the design of the fuel cell unit 100. In other words, it is possible to design the fuel cell unit 100 in a variety of sizes in accordance with an increase and decrease of output performance, thus making it easier to handle variation development of the vehicle 20.

Figure 7:
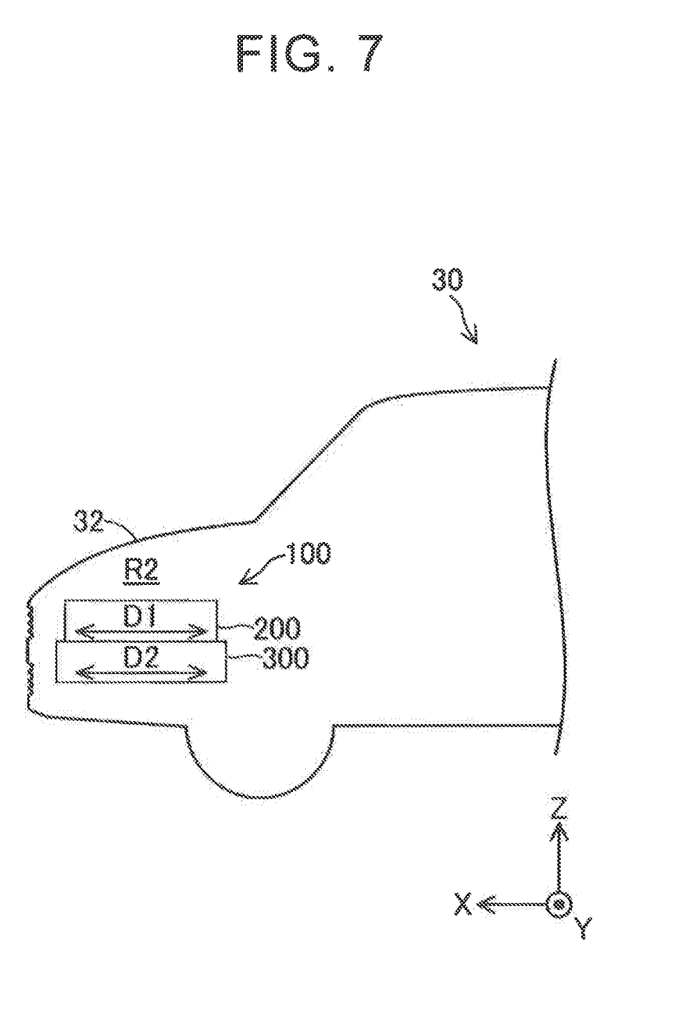
FIG. 7 is an explanatory view showing a skeleton of a vehicle having the fuel cell unit according to the first embodiment.

C. The third embodiment: FIG. 7 is an explanatory view showing a skeleton of a vehicle 30 having the fuel cell unit 100 according to the first embodiment. The vehicle 30 is an electrically driven vehicle that is driven by motor. The front side of the vehicle 30 is directed to the positive side of the X axis direction. A space in the vehicle 30 for the fuel cell unit 100 to be mounted to is an interior region R2 of the vehicle 30 on the negative side of the Z axis direction with respect to a hood 32 on the front side of the vehicle 30.

In the fuel cell unit 100, the array direction D2 of the reactors L and the power modules IPM and the laminating direction D1 in which the single cells 220 are laminated are generally parallel with each other along the front-rear direction of the vehicle 30. Therefore, even with the vehicle 30 in which the interior region R2 is relatively narrow in the front-rear direction, it is possible to mount the fuel cell unit 100 on the vehicle 30 by changing the design of the fuel cell unit 100. In other words, it is possible to design the fuel cell unit 100 in various sizes in accordance with an increase and a decrease of output performance, thus making it easier to handle variation development of the vehicle 30.

Figure 8:
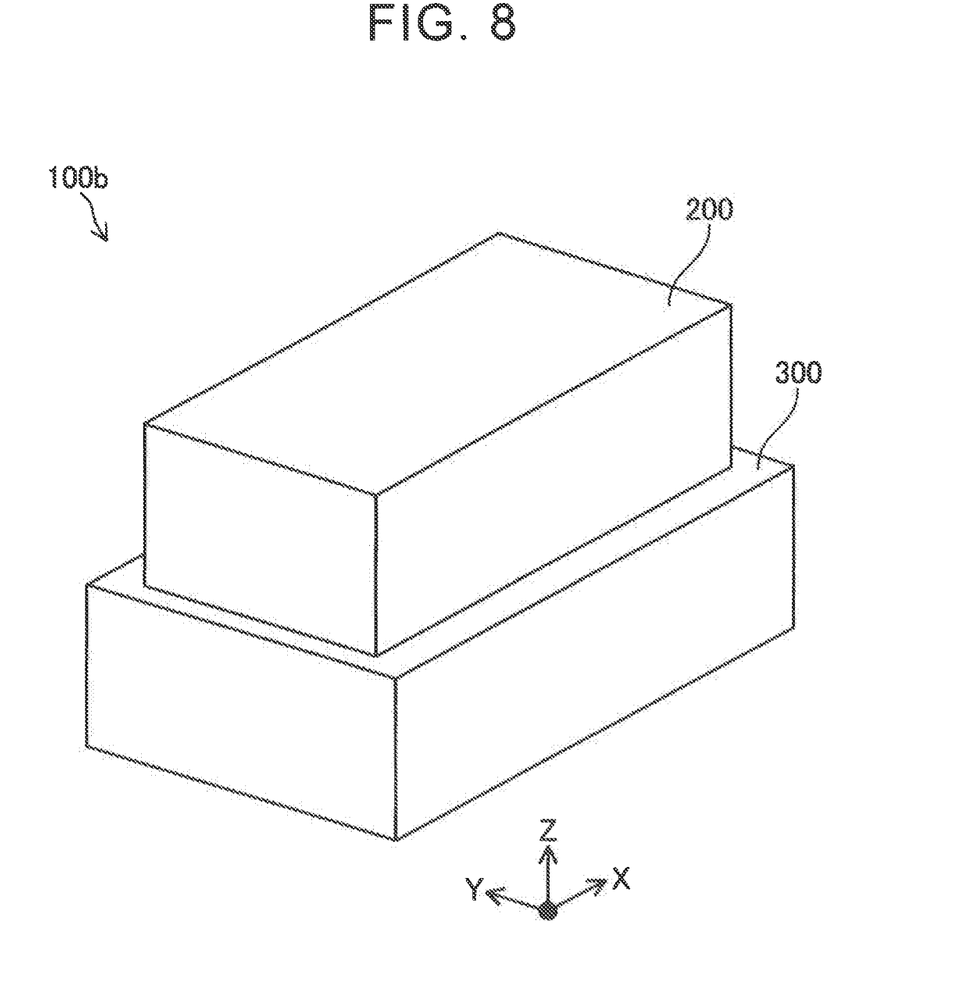
FIG. 8 is a conceptual view of a layout structure of a fuel cell unit according to another embodiment.

D. The fourth embodiment: FIG. 8 is a conceptual view of a layout structure of a fuel cell unit 100b according to another embodiment. The fuel cell unit 100b has the same structure as the fuel cell unit 100 according to the first embodiment except that a positional relation between a fuel cell case 200 and a converter case 300 in the Z axis direction is different. In the fuel cell unit 100b, the fuel cell case 200 is arranged on the positive side of the Z axis direction with respect to the converter case 300.

Figure 9:
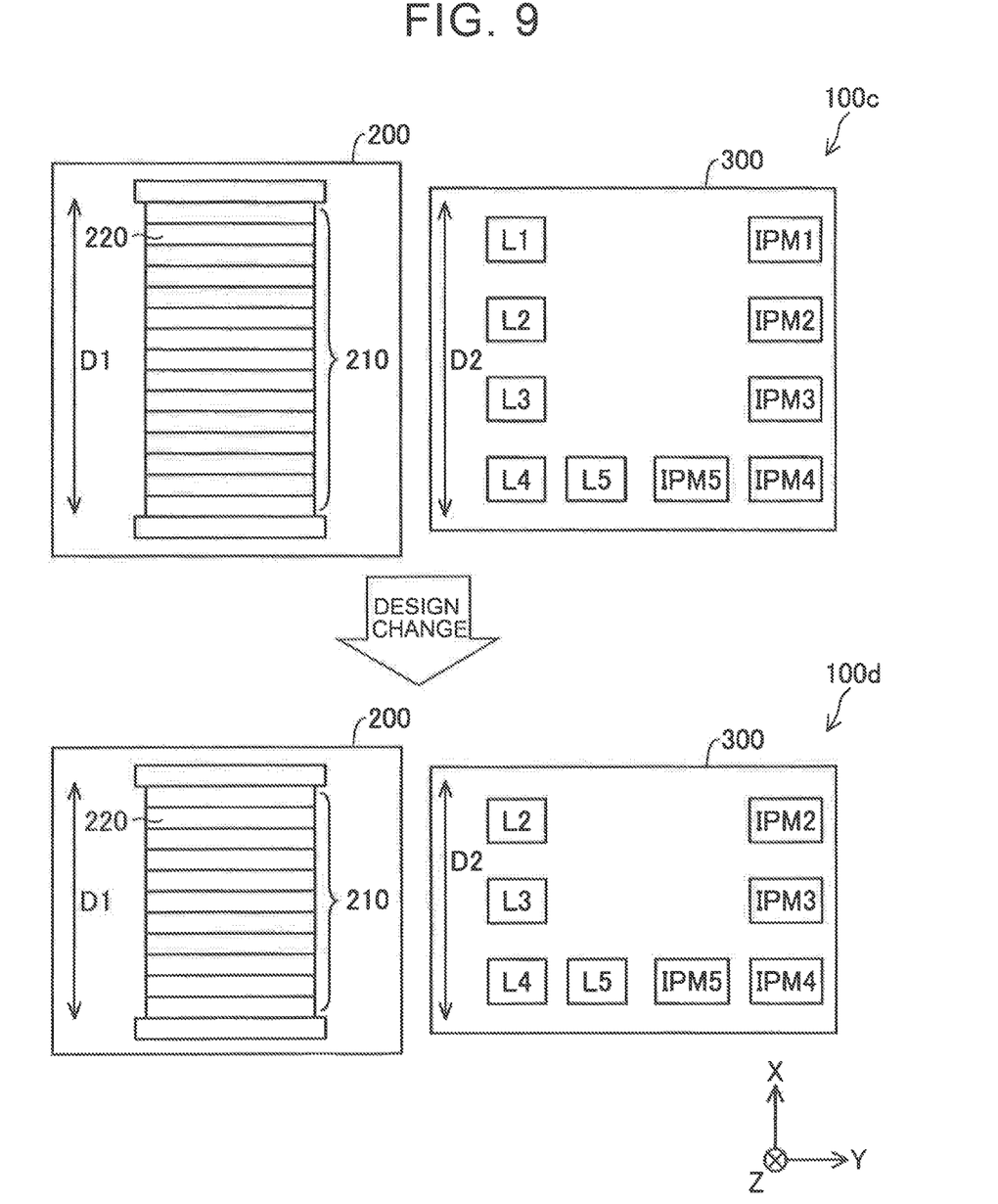
FIG. 9 is an explanatory view of changes when a design of the fuel cell unit according to another embodiment is changed.

E. The fifth embodiment: FIG. 9 is an explanatory view of changes when a design of the fuel cell unit 100c according to another embodiment is changed. In the upper section of FIG. 9, the fuel cell unit 100e is shown. In the lower section of FIG. 9, a fuel cell unit 100d is shown, which is the fuel cell unit 100c after the design change.

The fuel cell unit 100c is the same as the fuel cell unit 100 except that a converter is provided in addition to the four-phase converter provided in the fuel cell unit 100. The additional converter provided in the fuel cell unit 100e includes a reactor L5 and a power module IPM5. In FIG. 9, only the reactors L and the power modules IPM are shown as components inside the converter case 300 in the fuel cell unit 100c and the fuel cell unit 100d in order to facilitate understanding. Also, in FIG. 9, the reactors L and the power modules IPM are shown only by their reference numerals, respectively, in order to simplify the drawing.

In the fuel cell unit 100c, the reactors L1, L2, L3, L4 and the power modules IPM1, IPM2, IPM3, IPM4 are arrayed in the direction D2 that is generally parallel with the X axis direction. The reactor L5 is arranged on the positive side of the Y axis direction with respect to the reactor L4. The power module IPM5 is arranged on the negative side of the Y axis direction with respect to the power module IPM4.

The fuel cell unit 100d has output performance lower than that of the fuel cell unit 100c. In a case where the design of the fuel cell unit 100c is changed to the fuel cell unit 100d having lower output performance, the design change is made by reducing the numbers of the reactors L1, L2, L3 and the power modules IPM1, IPM2, IPM3 and the number of single cells 220 from those of the fuel cell unit 100c. This means that the dimension change direction of the fuel cell 210 is the same as the dimension change directions of the reactors L and the power modules IPM, and it is thus possible to restrain the design change of the fuel cell unit 100c from becoming complex.

F. A modified example: In the first embodiment, the fuel cell case 200 is arranged on the negative side of the Z axis direction with respect to the converter case 300, but the disclosure is not limited to this. For example, the fuel cell case 200 and the converter case 300 may be arranged next to each other in the Y axis direction.

In the first embodiment, the size of the fuel cell case 200 is smaller than that of the converter case 300, but the disclosure is not limited to this. For example the size of the fuel cell case 200 may be larger than or the same as that of the converter case 300.

In the first embodiment, the direction D2 in which the reactors L and the power modules IPM are arrayed is generally parallel with the laminating direction D1 of the single cells 220 but the disclosure is not limited to this. For example, if the size of the reactor L is larger than that of the power module IPM, and only the size of the reactor L affects the design of the fuel cell unit 100 greatly, only the array direction of the reactors L may be generally parallel with the laminating direction D1 of the single cells 220. Further, if the size of the power module IPM is larger than that of the reactor L, and only the size of the power module IPM affects the design of the fuel cell unit 100 greatly, only the array direction of the power modules IPM may be generally in parallel with the laminating direction of the single cells 220.

In the first embodiment, the direction D2 in which the reactors L and the power modules IPM are arrayed is generally parallel with the laminating direction D1 of the single cells 220, but the disclosure is not limited to this. For example, the direction D2 in which the reactors L and the power modules IPM are arrayed may be parallel with the laminating direction D1 of the single cells 220.

In the fifth embodiment, one reactor L5 is provided at a position shifted in the axis direction from the reactors L1, L2, L3, L4 arrayed in the direction D2, and one power module IPM5 is provided at a position shifted in the Y axis direction from the power modules IPM1, IPM2, IPM3, IPM4 arrayed in the direction D2, but the disclosure is not limited to this. For example, a plurality of reactors may be provided at positions shifted in the Y axis direction from the reactors L1, L2, L3, L4 arrayed in the direction D2, and a plurality of power modules may be provided at positions shifted in the Y axis direction from the power modules IPM1, IPM2, IPM3, IPM4 arrayed in the direction D2. In such a form, the design change of the fuel cell unit having output performance in accordance with a type of an electrically driven vehicle is made by adjusting the numbers of the reactors L and the power modules IPM arrayed in the direction D2.

The disclosure may be carried out in, for example, the following forms.

A fuel cell unit is provided with a fuel cell body having a plurality of single cells laminated in a given direction, and a multi-phase boost converter that is arranged in parallel with the fuel cell body along the given direction and has a plurality of converters that boost voltage outputted from the fuel cell body. The multi-phase boost converter has the plurality of reactors, which are electrically connected with the fuel cell body and are connected in parallel with each other, and a plurality of switching elements provided corresponding to the reactors. At least either the plurality of reactors or the plurality of switching elements are arrayed in generally parallel with the given direction, and the first reactor or switching element in the array is at the same position as the first single cell among the plurality of single cells laminated.

Figure 10:
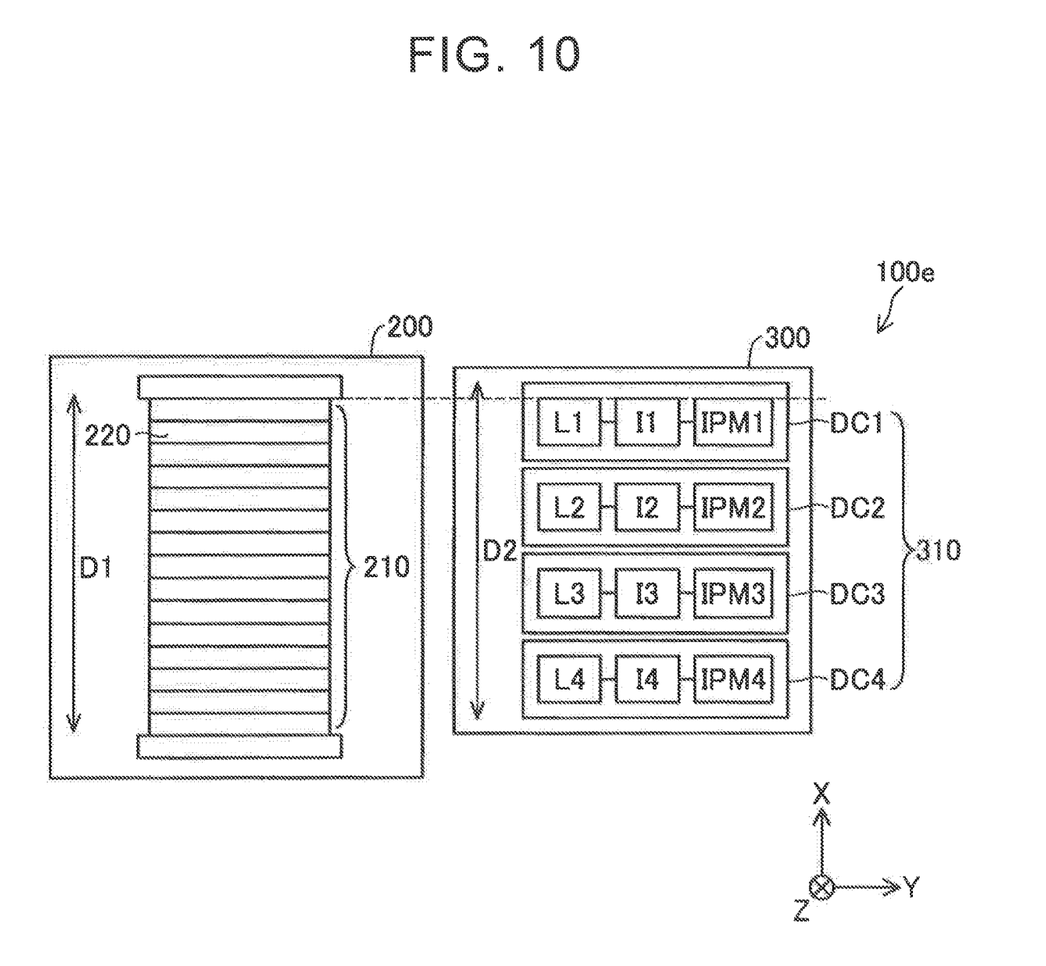
FIG. 10 is a conceptual view of a layout structure of a fuel cell unit according to yet another embodiment.

FIG. 10 is a conceptual view showing a layout structure of a fuel cell unit 100e according to another embodiment. The fuel cell unit 100e is the same as the fuel cell unit 100 except that a multi-phase converter 310 is arranged differently.

The multi-phase converter 310 in the fuel cell unit 100e is arranged so that an end portion of a reactor L1 on the positive side of the X axis direction is generally the same position in the X axis direction as that of an end portion of the laminated single cells 220 on the positive side of the X axis direction. The meaning of "generally the same position" herein means not only that the end portion of the reactor L1 on the positive side in the X axis direction and the end portion of the laminated single cells 220 on the positive side of the X axis direction are the same position in the X axis direction, but also that, in the X axis direction, the end portion of the reactor L1 on the positive side of the X axis direction is located within a range of the length of the first single cell 220 in the X axis direction on the positive side of the X axis direction among the laminated single cells 220.

According to this form, the end portion of the reactor L and the end portion of the laminated single cells 220 are at generally the same position on the positive side of the X axis direction, and the design of the fuel cell unit 100e is changed by adjusting the number of reactors and the number of single cells 220 on the negative side of the X axis direction. Therefore, when designing the fuel cell unit 100e having output performance in accordance with a type of an electrically driven vehicle, it is possible to reduce the size of the fuel cell unit 100e in the X axis direction.

Further, in the foregoing fuel cell unit 100e, the end portion of the reactor L1 on the positive side in the X axis direction is at generally the same position in the X axis direction as the end portion of the laminated single cells 220 on the positive side of the X axis direction, but the disclosure is not limited to this. For example, the end portion of the switching element SW1 on the positive side of the X axis direction, or the end portion of the reactor L1 on the positive side of the X axis direction and the end portion of the switching element SW1 on the positive side of the X axis direction may be arranged so as to be at generally the same position as the end portion of the laminated single cells 220 on the positive side of the X axis direction.

The disclosure is not limited to the foregoing embodiments, examples, and modified examples, and is carried out in various structures without departing from the gist of the disclosure. For example, the technical features in the embodiments, examples, and modified examples, corresponding to the technical features in each form described in the abstract of the disclosure may be replaced and combined as necessary in order to solve a part or all of the problems stated earlier or to achieve a part or all of the foregoing effects. Also, unless explained as essentials in the description, these technical features may be deleted as appropriate.

What is claimed is:

1. A fuel cell unit comprising:
a fuel cell having single cells laminated in a laminating direction; and
a converter having at least three combinations of a reactor electrically connected with the fuel cell and a power module electrically connected with the reactor, wherein
a direction in which the at least three reactors are arrayed and a direction in which the at least three power modules are arrayed are parallel with the laminating direction of the single cells.

2. The fuel cell unit according to claim 1, wherein the fuel cell is on an upper side of the converter in a gravitational direction or on a lower side of the converter in the gravitational direction.

3. A vehicle in which the fuel cell unit according to claim 1 is mounted, wherein the fuel cell is adjacent to the converter.

4. The vehicle according to claim 3, wherein the fuel cell is located on an upper side of the converter in an up-down direction of the vehicle or a lower side of the converter in the up-down direction of the vehicle.

5. The vehicle according to claim 3, wherein the laminating direction is parallel with a vehicle width direction of the vehicle.

6. The vehicle according to claim 3, wherein the laminating direction is parallel with a front-rear direction of the vehicle.

7. The vehicle according to claim 3, wherein
one of the single cells at outermost positions in the laminating direction and one of the at least three reactors at outermost positions in the laminating direction are located on a same plane perpendicular to the laminating direction,
the at least three reactors being arrayed in a direction toward the other one of the single cells at the outermost positions in the laminating direction from the one of the at least three reactors at one of the outermost positions in the laminating direction.

8. The vehicle according to claim 3, wherein
one of the single cells at outermost positions in the laminating direction and one of the at least three power modules at outermost positions in the laminating direction are located on a same plane perpendicular to the laminating direction,
the at least three power modules being arrayed in a direction toward the other one of the single cells at the outermost positions in the laminating direction from the one of the at least three power modules at one of the outermost positions in the laminating direction.

9. The vehicle according to claim 5, wherein the fuel cell is adjacent to the converter in a front-rear direction of the vehicle.

10. The vehicle according to claim 7, wherein the fuel cell is adjacent to the converter in a vehicle width direction of the vehicle.

11. The fuel cell unit according to claim 1, wherein the converter includes at least one of:
one reactor of the at least three reactors being in a direction inclined to the laminating direction, as seen from another reactor of the at least three reactors, or
one power module of the at least three power modules being in a direction inclined to the laminating direction, as seen from another power module of the at least three power modules.

12. The fuel cell unit according to claim 1, wherein
one of the single cells at outermost positions in the laminating direction and one of the at least three reactors at outermost positions in the laminating direction are located on a same plane perpendicular to the laminating direction,
the at least three reactors being arrayed in a direction toward the other one of the single cells at the outermost positions in the laminating direction from the one of the at least three reactors at one of the outermost positions in the laminating direction.

13. The fuel cell unit according to claim 1, wherein
one of the single cells at outermost positions in the laminating direction and one of the at least three power modules at outermost positions in the laminating direction are located on a same plane perpendicular to the laminating direction,
the at least three power modules being arrayed in a direction toward the other one of the single cells at the outermost positions in the laminating direction from the one of the at least three power modules at one of the outermost positions in the laminating direction.

* * * * *